United States Patent Office 2,808,643
Patented Oct. 8, 1957

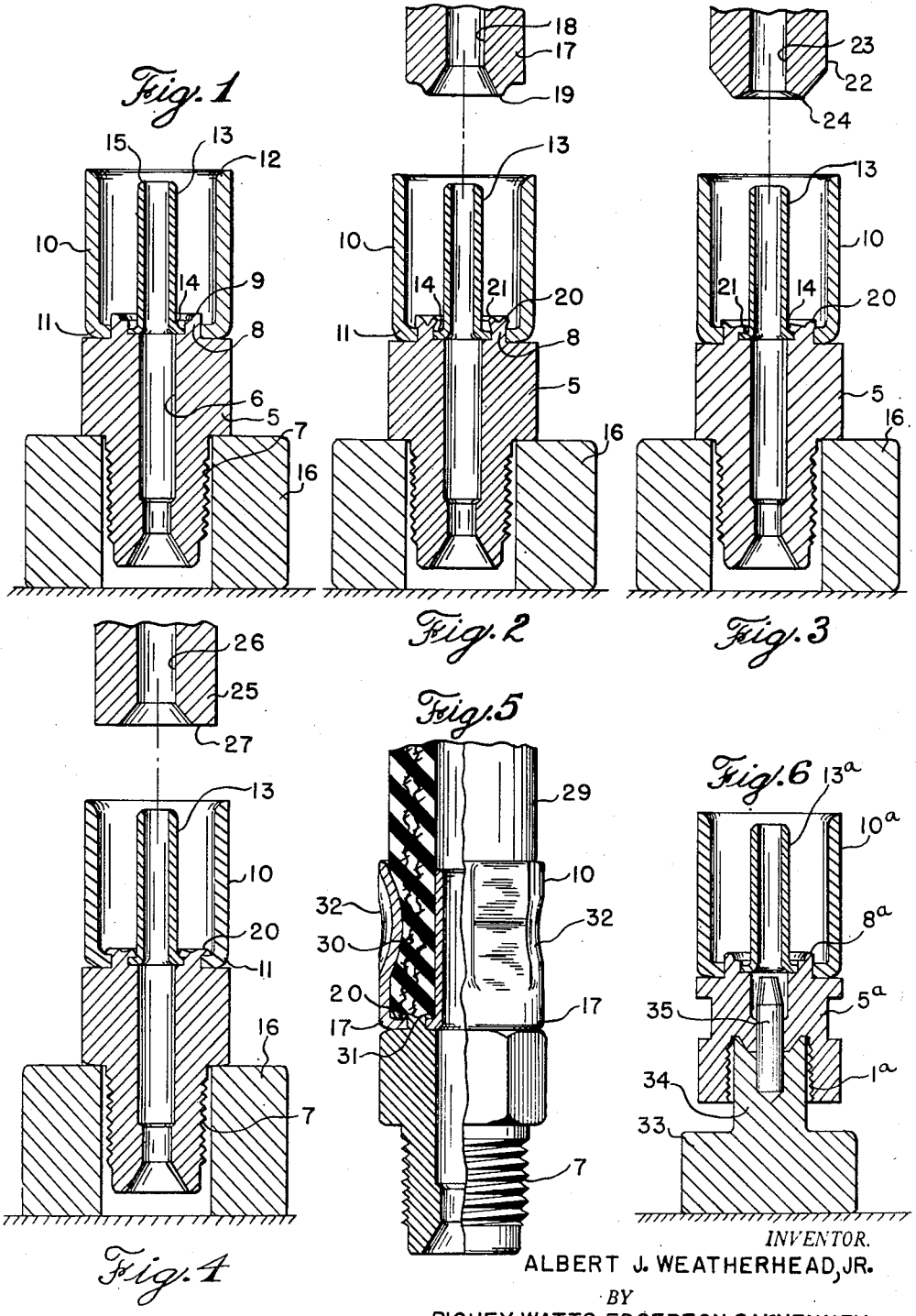

2,808,643

METHOD OF FABRICATING HOSE COUPLING MEMBERS

Albert J. Weatherhead, Jr., Cleveland, Ohio, assignor to The Weatherhead Company, Cleveland, Ohio, a corporation of Ohio Application July 13, 1954, Serial No. 443,000

4 Claims. (Cl. 29—508)

This invention relates to hose coupling and more particularly to a coupling having a body, sleeve and nipple secured to each other by upsetting a portion of the body.

The wide current use of flexible hose for the transmission of high pressure hydraulic fluid has resulted in the development of numerous devices for anchoring the end of the hose to a rigid body such as a hydraulic brake cylinder fitting. Ordinarily, such hose couplings or "hose ends" are machined from a solid section of bar stock to provide an integrally formed sleeve proportioned to surround the outer wall of the hose and a coaxially disposed nipple within the sleeve, which nipple is designed to be inserted in the open end of the hose. The body of the hose coupling is usually threaded at the end thereof opposite the sleeve to facilitate the threaded connection of the hose coupling to an adjoining line or fitting. The machining operation involves the cutting away of a considerable portion of the metal of the solid bar stock resulting in the loss as scrap of about 50% by weight of the original starting blank stock. According to the present invention the machining or metal removing operations are limited so as to result in reduced scrap loss and lowered manufacturing costs.

It is among the objects of the present invention to provide a hose coupling and method of making the same wherein the fitting body, the sleeve, and the nipple are separately formed and are connected to each other by upsetting a portion of the material of the body over portions of the sleeve and nipple.

It is a further object of the present invention to provide a hose coupling wherein one end of the body of the fitting is provided with an axially extending annular rib and wherein the sleeve is proportioned to surround the rib and the nipple is proportioned to fit within the rib and the three parts are secured to each other by upsetting the rib.

It is a further object of the invention to provide a hose coupling according to the preceding objects wherein the nipple is in the form of a brass eyelet and the sleeve and body of the coupling are separately formed steel sections.

Further objects and advantages relating to durability, long life, efficiency in operation and economy in manufacture, will appear from the following description and the appended drawings wherein;

Fig. 1 is a sectional view showing the hose coupling parts assembled on a holding fixture prior to the first upsetting operation;

Fig. 2 is a view similar to Fig. 1 showing the parts of the hose coupling subsequent to the first upsetting operation and the upsetting tools employed;

Fig. 3 is a sectional elevation showing the hose coupling subsequent to the second upsetting operation and the tools provided to carry out such second upsetting operation;

Fig. 4 is a sectional view similar to Fig. 3 showing the third upsetting operation and the tools for effecting the third and final upsetting of the coupling;

Fig. 5 is a view showing the hose coupling as finally assembled with the sleeve crimped down on a length of flexible rubber-like hose; and Fig. 6 is a sectional view showing a modified form of coupling body and the modified form of holder to facilitate the assembly of the hose coupling.

Referring to the drawing, the parts which comprise the hose coupling according to my invention include a body 5 which is machined to provide a hex exterior and an internal bore 6. One end of the body 5 is threaded as at 7 and the other end of the body 5 is machined to provide an annular rib 8 which is formed to provide a shoulder 9. The body 5 is preferably made of steel and the sleeve 10 is a steel cup drawn from sheet stock and having an opening within the flanged end 11 proportioned to fit snugly about the outer cylindrical wall of the rib 8. Preferably the sleeve 10 is chamfered as at 12 to provide a non-fraying bell-mouth portion adapted to bear against the hose. The nipple, indicated in its entirety as at 13, is in the form of a brass eyelet having the exterior flange 14 proportioned to fit snugly against the inner wall of the rib 8. The eyelet at its outer end is also rounded as at 15 to prevent fraying or cutting of the hose when the hose is flexed with respect to the fitting. The parts of the hose coupling 5, 10 and 13 are arranged in a holder 16 adapted to be mounted on the bed frame die of a press (not shown). The ram of the press includes a punch 17 provided with an interior bore 18 proportioned to freely receive the nipple 13. The working face of the punch 17 is provided with an annular pointed rib 19 that is proportioned to engage the rib 8 on the body of the fitting within the shoulder 9 so as to displace the metal of the rib 8 outwardly as at 20 and inwardly as at 21. The result of the particular formation of the rib 8 and the action of the punch 17 is as illustrated in Fig. 2 wherein a greater proportion of the metal of the rib 8 is upset outwardly as at 20 to overhang the flange 11 on the sleeve 10. The minor portion of the metal in the rib 8 is upset inwardly as at 21 towards the flange 14 on the brass nipple 13. It will be noted that the metal of the rib 8 which is upset inwardly as at 21 is not brought into engagement with the upper side of the flange 14 in the first upsetting operation but at the same time a part of the metal of the rib 8 as at 20 is upset outwardly over the flange 11 on the steel sleeve.

In the second upsetting operation the hose coupling is indexed or transferred to a position beneath an upsetting punch 22 which is provided with a bore 23 proportioned to receive the nipple 13. If desired, the tools might index to present the second upsetting punch 22 without indexing the work. The working face of the punch is shaped to provide an annular rib having a sharp point as at 24 and the action of this punch on the rib 8 results in upsetting the portion 21 of the rib 8 into overhanging tight engagement with the flange 14 on the brass nipple. It will be noted that the action of the punch 22 effects little or no working of that portion of the rib indicated at 20. This sequential working of the steel over the brass eyelet flange insures the positioning of sufficient upset metal for the sleeve and guards against collapse of the brass eyelet due to upsetting pressure.

Thereafter the hose coupling or tool is indexed or transferred to a position beneath a third punch 25 having an interior bore 26 adapted to receive the nipple 13 and being provided with a flat working face 27 which has a maximum diameter corresponding to the inner diameter of the sleeve 10. Upsetting action of the punch 25 results in forcing the rib 20 outwardly into tight engagement with the flange 11 on the steel sleeve 10. The brass and steel component parts of the fitting are thus firmly secured to each other in a fluid-tight relation and the hose coupling is ready for assembly with a length of hose. As shown in Fig. 5 a length of hydraulic hose 29 is moved into the sleeve 10 and the sleeve is thereafter crimped so as to grip the hose in the annular area indicated at 30. The crimping action forces the cut end face of the hose against the end face of the fitting which is formed by the upset rib 8 indicated at 31. The ribs 32 shown in Fig. 5 result from the crimping action accomplished by inwardly moving jaws of a crimping tool not shown.

In the form of the invention illustrated in Fig. 6 the body 5a is interiorly threaded as at 7a to form a female hose end assembly. The fitting 5a is provided with a rib 8a, a sleeve 10a and a nipple 13a and the parts are secured to each other by the upsetting tools and by the method described in connection with Figs. 1 to 4. To mount this form of hose coupling in a press, the bed frame holder for the body 5a comprises a base portion 33 with a stem 34 having a pin 35 aligned with the bore in the body of the fitting. It will be understood that the operation of the punches is such that the upsetting is divided into three phases which reduces the load required and permits the upsetting operation to be carried out on lighter presses than would be required if an attempt were made to upset the rib 8 in one operation. The sequential working of the inner and outer portions of the rib provides even distribution of the upset metal and protects the flange end of the brass eyelet. The first phase of the upsetting operation is in the nature of a dividing or spreading the rib 8 into two unequal parts. The second upsetting operation as effected by the punch 22, upsets the inner portion or lesser volume of the two parts and the third upsetting operation upsets the greater of the two parts.

From the foregoing description, it will be understood that the starting blank of solid stock which forms the body of the hose coupling has an axial dimension corresponding to the distance from the end of the rib 8 to the forward threaded end of the body and thus the saving in bar stock over conventional methods may be about 50 percent. The sleeve being drawn from sheet steel stock is characterized by a density and grain structure which would not be obtainable by machining a sleeve from solid bar stock. The brass nipple is characterized by the economy obtained in bras eyelet machines and thus the multi-part fitting presents a marked reduction in machining and material costs.

Although I have shown and described two forms of hose coupling in considerable detail, it will be appreciated by those skilled in the art that colorable variations may be made in the article and the method of making the same without departing from the scope of the invention as defined in the following claims:

What is claimed is:

1. That method of making hose coupling which comprises machining a length of bar stock to provide a body having a central bore, forming an annular rib on one end face of said body coaxially of the bore, drawing a metal cup from sheet stock and providing an opening in the bottom of said cup corresponding substantially to the outer diameter of said annular rib, telescoping the opening in the cup on said rib, forming a tubular brass eyelet with a projecting flange at one end and placing the eyelet within said rib with the flanged end of the eyelet in engagement with said body and thereafter upsetting the rib to overhang the cup bottom and eyelet portions to secure the body, sleeve and eyelet to each other coaxially.

2. That method of making hose coupling which comprises machining a length of hexagonal bar stock to provide a body having an hexagonal exterior and a central bore, forming an annular rib on one end face of said body coaxially of the bore, the outer periphery of said rib having an axially extending shoulder, drawing a metal sleeve from sheet stock and providing a flange on one end of the sleeve corresponding to the outer diameter of said annular rib, assembling the sleeve on said rib, forming a tubular eyelet with an outwardly projecting flange at one end and placing the eyelet within said rib with the flanged end of the eyelet in engagement with said body and thereafter sequentially upsetting the rib to overhang the eyelet and sleeve flanges to secure the body, sleeve and eyelet to each other in coaxial arrangement.

3. That method of making a hose coupling which comprises machining a steel body to provide a longitudinal bore, threading the exterior of one end of said body and providing an axially extending annular rib at the other end of said body, said rib being concentric with respect to said bore, telescoping an interiorly flanged steel sleeve over said rib, inserting an exteriorly flanged brass eyelet within said rib, upsetting said rib in three steps, the first step comprising pressing a portion of said rib metal radially inward, the second step comprising axially pressing the radially inward portion resulting from the first step over the flange on said brass eyelet and thereafter as a third step axially pressing the radially outermost portion of the rib over the inturned flange on said sleeve whereby said body, sleeve and eyelet are secured to each other in fluid-tight relation.

4. That method of making a hose coupling which comprises machining a steel body to provide a longitudinal bore, threading the exterior of one end of said body and providing an axially extending annular rib at the other end of said body, said rib being concentric with respect to said bore, telescoping an interiorly flanged steel sleeve over said rib, inserting an exteriorly flanged brass eyelet within said rib, upsetting said rib in three steps, the first step comprising pressing with a sharp edge annular punch a porton of said rib metal radially inward, the second step comprising pressing with a flat-faced punch the inner portion resulting from the first step over the flange on said brass eyelet and thereafter as a third step axially pressing with a flat-faced punch the outermost portion of the rib over the inturned flange on said sleeve whereby said body, sleeve and eyelet are secured to each other in fluid-tight relation.

References Cited in the file of this patent

UNITED STATES PATENTS

| | | |
|---|---|---|
| 1,903,776 | Clark et al. | Apr. 18, 1933 |
| 1,928,836 | Loughead | Oct. 3, 1933 |
| 2,090,251 | Cowles | Aug. 17, 1937 |
| 2,133,313 | Weatherhead | Oct. 18, 1938 |

FOREIGN PATENTS

| | | |
|---|---|---|
| 372,209 | Italy | June 20, 1939 |
| 145,206 | Australia | Feb. 15, 1952 |
| 1,014,789 | France | Aug. 21, 1952 |